(12) United States Patent
Curtis et al.

(10) Patent No.: US 8,046,739 B2
(45) Date of Patent: Oct. 25, 2011

(54) SYSTEM AND METHOD FOR ENABLING A GRAPHICAL PROGRAM TO PROPAGATE ATTRIBUTES OF INPUTS AND OUTPUTS OF BLOCKS

(75) Inventors: Matthew C. Curtis, Austin, TX (US); James M. Lewis, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1293 days.

(21) Appl. No.: 11/462,551

(22) Filed: Aug. 4, 2006

(65) Prior Publication Data
US 2008/0034345 A1    Feb. 7, 2008

(51) Int. Cl.
G06F 9/44 (2006.01)
(52) U.S. Cl. .................. 717/113; 717/105; 717/109
(58) Field of Classification Search .................. None
See application file for complete search history.

(56) References Cited

U.S. PATENT DOCUMENTS

| | | | |
|---|---|---|---|
| 5,481,741 A | | 1/1996 | McKaskle et al. |
| 5,905,649 A | | 5/1999 | Sojoodi et al. |
| 6,064,812 A | | 5/2000 | Parthasarathy et al. |
| 6,064,816 A | * | 5/2000 | Parthasarathy et al. ....... 717/109 |
| 6,738,964 B1 | * | 5/2004 | Zink et al. ............. 717/105 |
| 7,086,040 B2 | | 8/2006 | Joisha et al. |
| 7,089,223 B2 | | 8/2006 | Bartlett et al. |
| 7,089,530 B1 | * | 8/2006 | Dardinski et al. ........... 717/105 |
| 7,275,026 B2 | * | 9/2007 | Mani et al. .................. 703/13 |
| 7,424,684 B2 | * | 9/2008 | Orofino et al. ............... 715/762 |
| 2003/0005270 A1 | | 1/2003 | Bartlett et al. |
| 2005/0107998 A1 | * | 5/2005 | McLernon et al. ............ 703/22 |
| 2006/0117302 A1 | | 6/2006 | Mercer et al. |

OTHER PUBLICATIONS

"Simulink Fixed Point 6.1—Design and Simulate Fixed-Point Systems"; The MathWorks; Oct. 2008; http://www.mathworks.com/products/simfixed/; 3 pages.

* cited by examiner

*Primary Examiner* — Michael J Yigdall
(74) *Attorney, Agent, or Firm* — Meyertons Hood Kivlin Kowert & Goetzel, P.C.; Jeffrey C. Hood; Joel L. Stevens

(57) ABSTRACT

A system and method for creating a graphical program. A function block may be displayed in a graphical program. The graphical program may include a plurality of interconnected blocks which visually indicate the functionality of the program. Additionally, the function block may be operable to perform a first function and may include one or more inputs and one or more outputs. User input specifying an attribute behavior for the function block may be received, e.g., via a menu which allows selection or definition of attribute behaviors, a graphical wizard, or another graphical program, among other methods. The attribute behavior specified for the function block may be usable to determine at attribute of at least a subset of the one or more outputs of the function block based on an attribute of at least one of the one or more inputs to the function block.

20 Claims, 9 Drawing Sheets

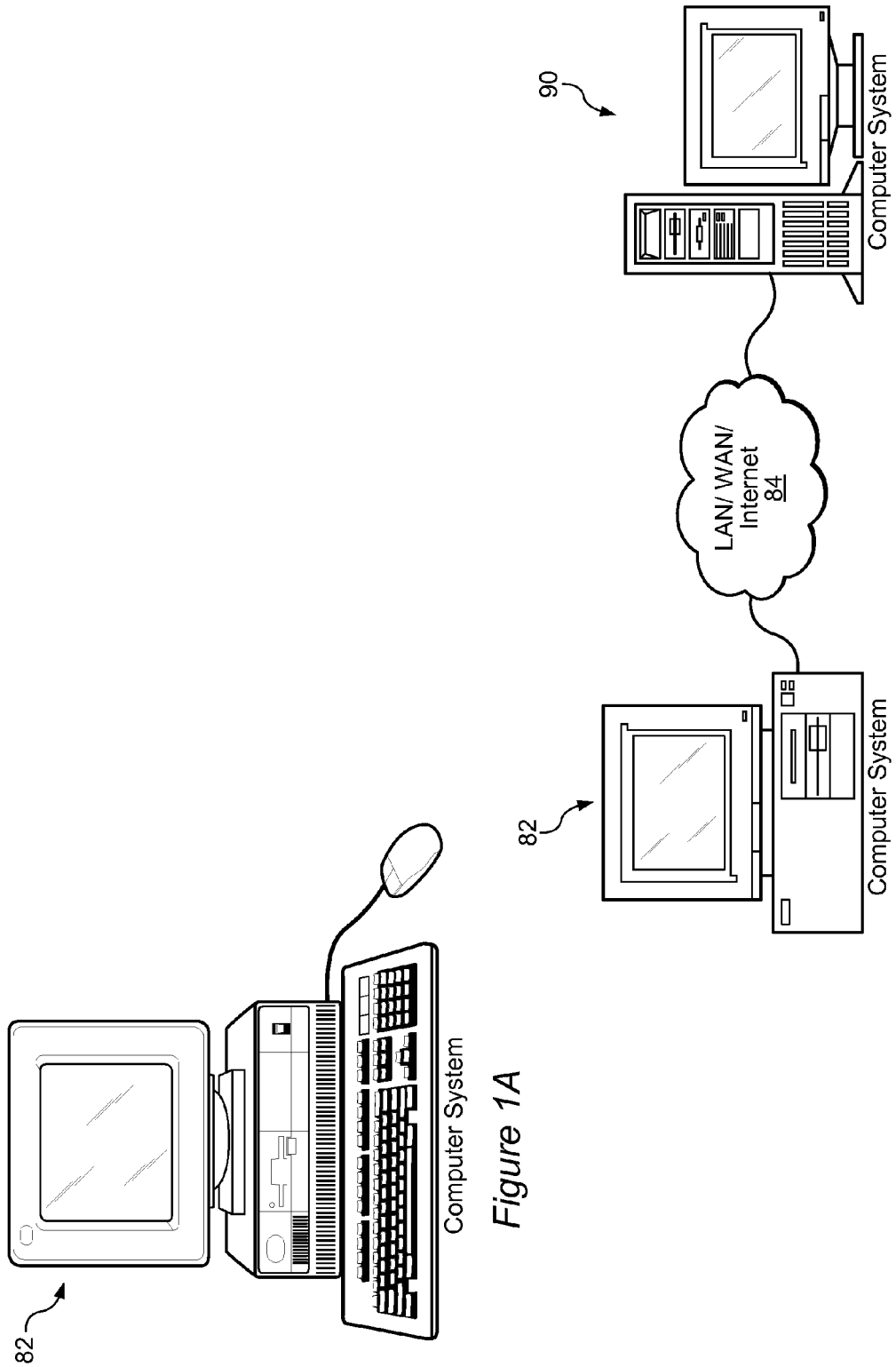

US 8,046,739 B2

SYSTEM AND METHOD FOR ENABLING A GRAPHICAL PROGRAM TO PROPAGATE ATTRIBUTES OF INPUTS AND OUTPUTS OF BLOCKS

FIELD OF THE INVENTION

The present invention relates to the field of graphical programming, and more particularly to a system and method for enabling a graphical program to propagate attributes inputs and outputs of blocks.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Using the various graphical programming methods described above, users will often have to assign attribute values for various nodes or blocks in the graphical program. For example, the user may have to assign representation(s) of the input, data type(s), bit (or byte) width, scaling factors or other attributes of the inputs and outputs associated for any one particular block or node. In many cases, the user may have to assign these attributes throughout the entire program in sets of nodes or even one by one.

Bartlett et al. (US Publication Number 2003/0005270, "Bartlett") describes propagating attributes in a block diagram system; however, the system and method disclosed in Bartlett requires creation and interconnection of propagation blocks which are connected to the inputs and outputs of other blocks in the block diagram. Thus, in order to propagate attributes using the methods of Bartlett, the user must define a propagation block for each block in the graphical program. Thus, improvements in attribute assignment in graphical programs is desirable.

SUMMARY OF THE INVENTION

Various embodiments of a system and method for enabling a graphical program to propagate attributes of blocks are presented below.

A function block may be displayed in a graphical program. The graphical program may be displayed on a display of a computer system. The computer system may be any of various computer systems/devices as desired. Additionally, the function block may be included in the graphical program via a variety of methods. For example, in some embodiments, the function block may be included in the graphical program manually. For example, the graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

It should be noted that the function block may also be included in the graphical program via other methods, e.g., automatic methods. For example, in an alternate embodiment, the graphical program may be created by the user creating or specifying a prototype, followed by automatic or programmatic creation of the graphical program from the prototype.

In one embodiment, the user may define the graphical program using a wizard or scripting tool, e.g., one that allows the user to iteratively describe the graphical program. In some embodiments, the wizard may include a series of graphical windows which asks the user to specify attributes of the graphical program. Correspondingly, the graphical program may be automatically generated from input received to the GUI, e.g., via the wizard. Thus, via various embodiments, the function block may be included and displayed in the graphical program.

As used herein, the term "functional block" is intended to include various graphical blocks or nodes included in the graphical program. For example, the functional block may include one or more inputs, e.g., coupled to one or more outputs of a second block(s) (or node), and one or more outputs, e.g., coupled to one or more inputs of a third block(s) (or node), and may perform a function using the one or more inputs (or a subset thereof) to produce the one or more outputs (or a subset thereof). Thus, according to various embodiments, the function block may be any of various structures or nodes which receives one or more inputs and produces one or more outputs.

In some embodiments, the one or more inputs and one or more outputs may include various attributes. For example, the attributes may include the bit or byte width and/or the representation, e.g., describing the data type attribute, of the inputs and/or outputs of the function block. In some embodiments, the attributes may also include a scale value and/or an offset value, e.g., when the function block/graphical program implements "fixed point" functions or overall schemes. For example, the scale and offset may specify the mapping of integers stored in a memory medium to a set user-desired numbers.

Alternatively, or additionally, the attribute(s) may include word length, integer word length, fraction word length, minimum value, maximum value, precision, delta, increment, and/or other attributes, such as those described above, among others. In some embodiments, the word length may refer to the minimum number of digits to store. Similarly, integer word length may refer to the minimum number of digits that may be used to store integer information, and fractional word length may refer to the minimum number of digits that may be used to store fractional information. Minimum and maximum values may refer to the smallest and largest values (respectively) to be represented. Precision, delta, and/or increment may each refer to the maximum distance between two consecutive numbers in the set of numbers represented (e.g., in the input/output of the node). Note that the above attributes are exemplary only and that other attributes are envisioned. Thus, according to various embodiments, the attributes may be any of numerous appropriate attributes of the inputs/outputs of the node(s).

In some embodiments, user input may be received which specifies an attribute behavior for the function block. The attribute behavior may define an attribute at least a subset of the one or more outputs based on an attribute of at least a subset of the one or more inputs. Additionally, the attribute behavior may also be based on one or more other graphical program objects (e.g. controls or indicators) or the graphical programming environment (e.g. target device limits).

The user may specify the attribute behavior for any of various attributes. In one embodiment, the attributes may include the input and/or output attribute(s) described above, among others. For example, the user input may specify the scale value of the output given the scale values (or other attributes) of one or more of the inputs. Thus, in some embodiments, the attribute behavior may be associated with any of various attributes described above, among others.

In one embodiment, the user may specify the attribute behavior by selecting the function block, e.g., for configuration. Upon selecting the function block, the user may specify the behavior via a graphical user interface, e.g., one usable to configure or specify the attribute behavior. In some embodiments, the graphical user interface may be a simple menu interface that allows the user to select or define a rule which specifies the attribute behavior for the function block. For example, as described above, the user may simply select a rule that defines the representation according to the representation(s) of the input(s) and defines the bit width as the greatest bit width of the inputs. Alternatively, if that rule is not available, the user may be able to enter the attribute behavior via various input methods, e.g., using a keyboard and/or mouse.

In some embodiments, the user may specify the attribute behavior by specifying a graphical program, e.g., a data flow graphical program. In this embodiment, the user may select the function block, e.g., by double clicking function block or right clicking the function block and selecting a "specify attribute behavior" (or similar option), and may then specify a graphical program which implements the desired attribute behavior, e.g., using a graphical program window. For example, in one embodiment, the user may arrange nodes (blocks or other icons) in a graphical program, e.g., displayed in the graphical program window, that represent attributes of the inputs and outputs.

In some embodiments, the user may not specify the attribute propagation of the input(s)/output(s) of the function block for only the selected function block. For example, the user may be able to specify a global propagation behavior or default propagation behavior for every node in the graphical program. Alternatively, or additionally, the user may choose a group of nodes/function blocks and assign attribute propagation for the inputs/outputs of those function blocks. In one embodiment, the user may be able to choose how each type of function block behaves in the graphical program. For example, the user may assign a default behavior for all multiply nodes, add nodes, and/or subtract nodes, among other types of function nodes. Correspondingly, when the user creates a new node of that type, the function node may propagate attributes according to the assigned default behavior. Additionally, or alternatively, the function nodes of that type that already exist in the graphical program may be changed to the default behavior, e.g., according to the desire of the user.

Similar to above, the user may specify these attribute propagations via a variety of appropriate methods, e.g., menus, wizards, other GUIs, and/or other methods. For example, in one embodiment, the user may edit a single node and then have the option to apply this configuration to other types of nodes or future nodes, e.g., of the current type. Alternatively, or additionally, the user may specify the behavior as a project preference in the graphical program. Thus, according to various embodiments, the user may specify that the attribute propagation apply to a variety of other nodes in the graphical program.

Note that in the embodiments described above, the input specifying the attribute behavior may be received from a user; however, in some embodiments, the attribute behavior may be specified indirectly or automatically, e.g., via algorithmic processes, or via indirect user input, among other methods. In some embodiments, the attribute behavior may be inferred from other input, e.g., as specified for previous function blocks programmed in the graphical program environment. Alternatively, or additionally, the attribute behavior may be determined using a default value which may be overridden by the user or by other processes in the graphical program. Thus, in some embodiments, the attribute behavior may be determined via a variety of methods.

In some embodiments, an attribute of a subset of the outputs of the function block may be determined based on an attribute of at least one of the inputs to the function block and/or other objects/settings which relate to the graphical program. In some embodiments this propagation may be performed during execution of the graphical program. Additionally, or alternatively, the propagation may be performed during edit time which may allow the user to view the propagated attributes across the entire graphical program and adjust as desired. This edit time propagation may be performed automatically, e.g., in accordance with the specified attribute behavior. In other words, the user may not have to specify or indicate in the development environment that the attributes should be propagated. Said another way, the attributes for an input or output may be propagated in real time as the user connects nodes and/or function blocks in the graphical program. Thus, in some embodiments, the attribute propagation may be performed during execution and/or edit time and may allow the user to view the propagation seamlessly and automatically.

Thus, according to various embodiments, attributes may be propagated for inputs and/or outputs of a function block in a graphical program.

BRIEF DESCRIPTION OF THE DRAWINGS

A better understanding of the present invention can be obtained when the following detailed description of the preferred embodiment is considered in conjunction with the following drawings, in which:

FIG. 1A illustrates a computer system operable to execute a graphical program according to an embodiment of the present invention;

FIG. 1B illustrates a network system comprising two or more computer systems that may implement an embodiment of the present invention;

Figure 2A:
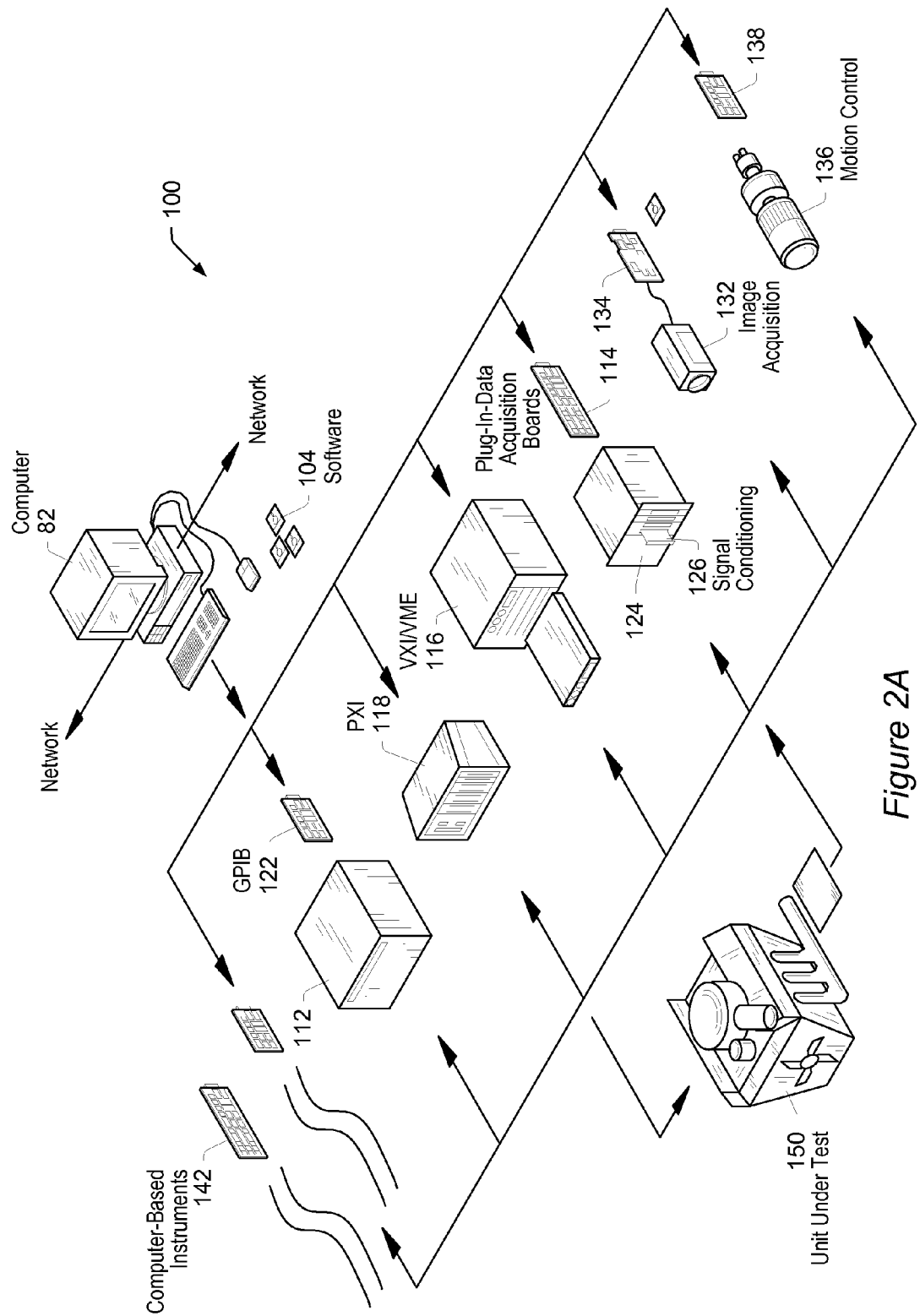
FIG. 2A illustrates an instrumentation control system according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20030005270 (Ser. No. 09/896,925) titled "Programmable Control of Data Attributes," filed Jun. 29, 2001.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a physical communication medium such as a bus, network and/or other physical transmission medium.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Graphical User Interface Element—an element of a graphical user interface, such as for providing input or displaying output. Exemplary graphical user interface elements comprise input controls and output indicators Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Input/Output Attribute—Some attribute or characteristic of the data type of an input or output parameter. For example, the number of bits required to store data of a given type.

Data Type—Describes how information (bits) in storage (memory) should be interpreted. For example, the data type 'double' commonly means a 64-bit floating-point number in IEEE 754 format.

Representation—With regards to numbers, how numbers are represented in storage. For example the text '−12' is decimal representation of the number negative twelve. In two's complement binary representation negative twelve is expressed as '10100'.

FIG. 1A—Computer System

FIG. 1A illustrates a computer system 82 operable to execute a graphical program configured to propagate attributes associated with inputs and outputs of blocks. One embodiment of a method for creating a graphical program operable to propagate attributes is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
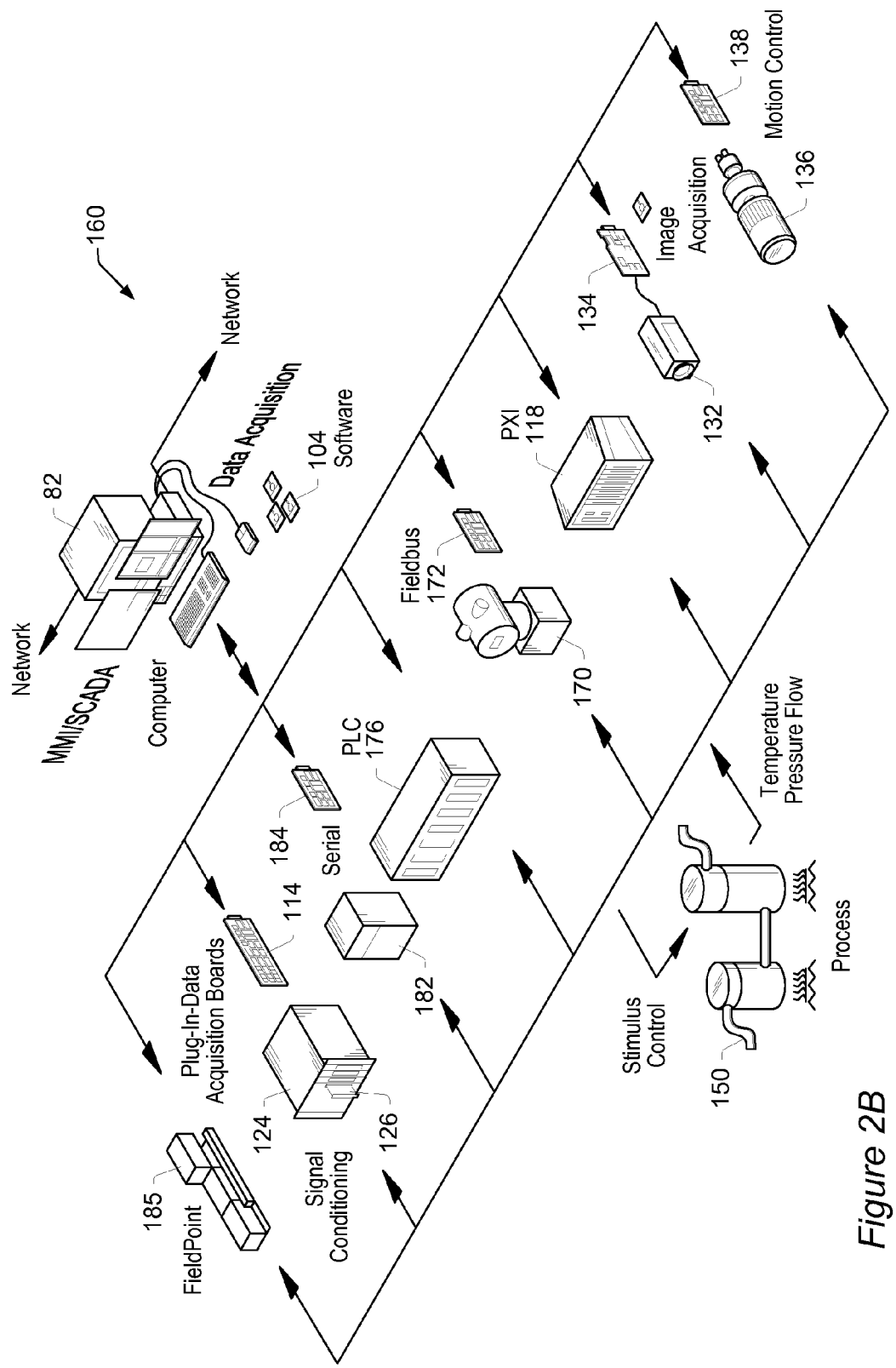
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
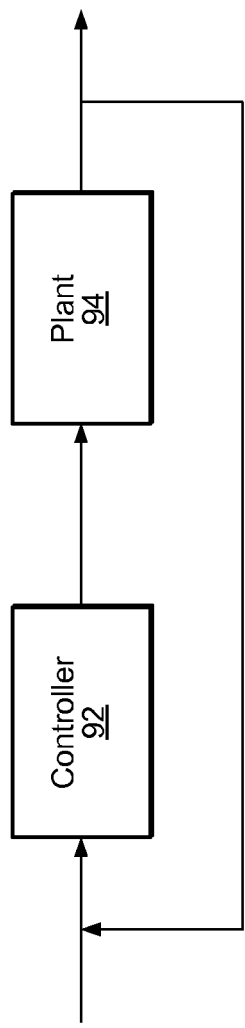
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
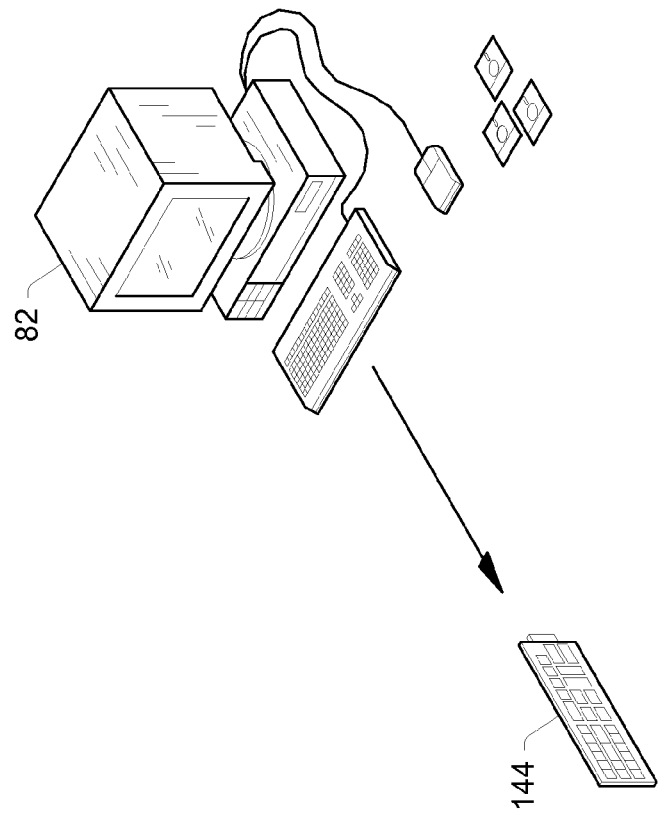
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
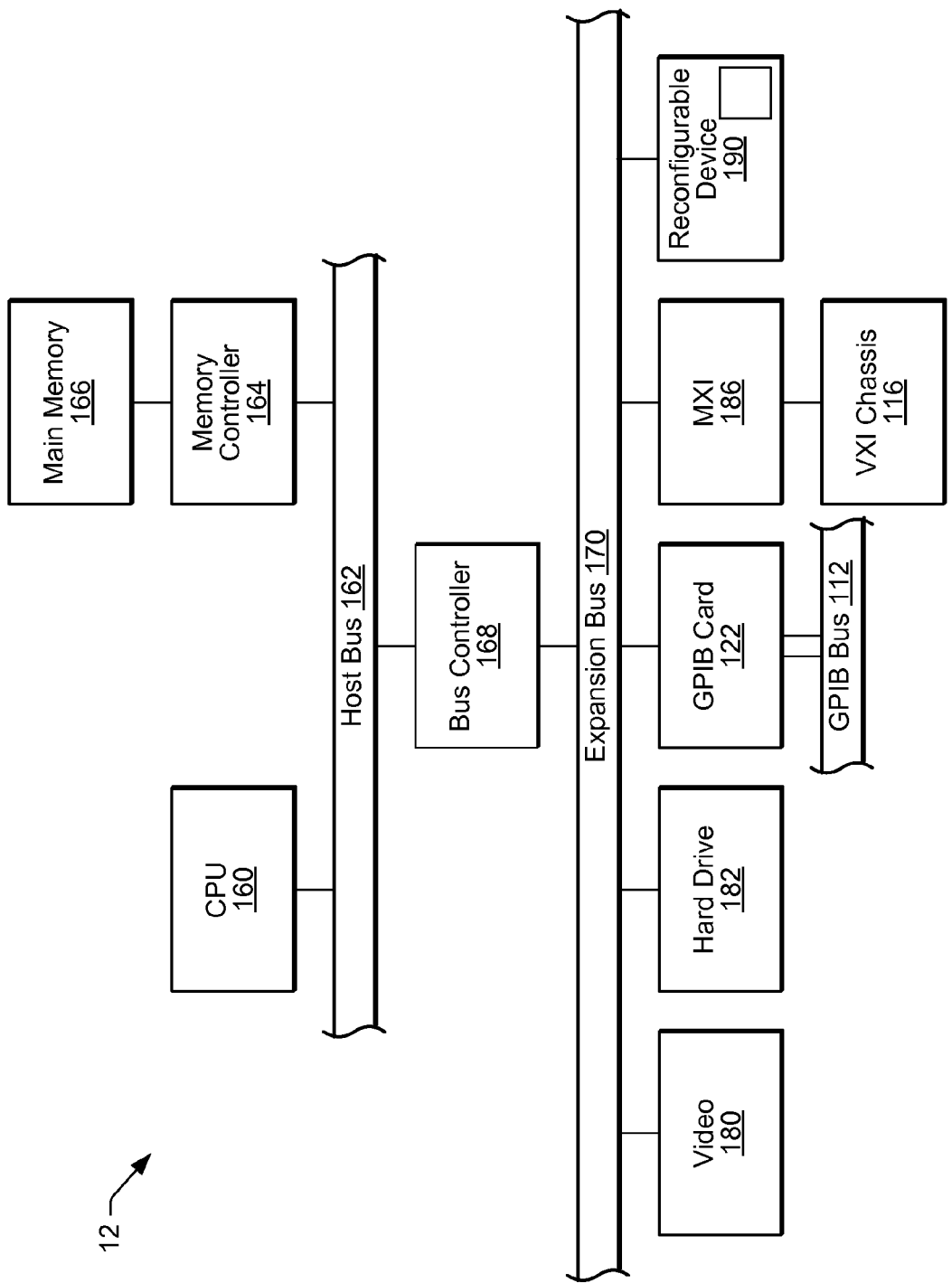
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to propagate attribute values for graphical nodes or blocks included in the graphical program. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 may further include a video display subsystem 180 and a hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
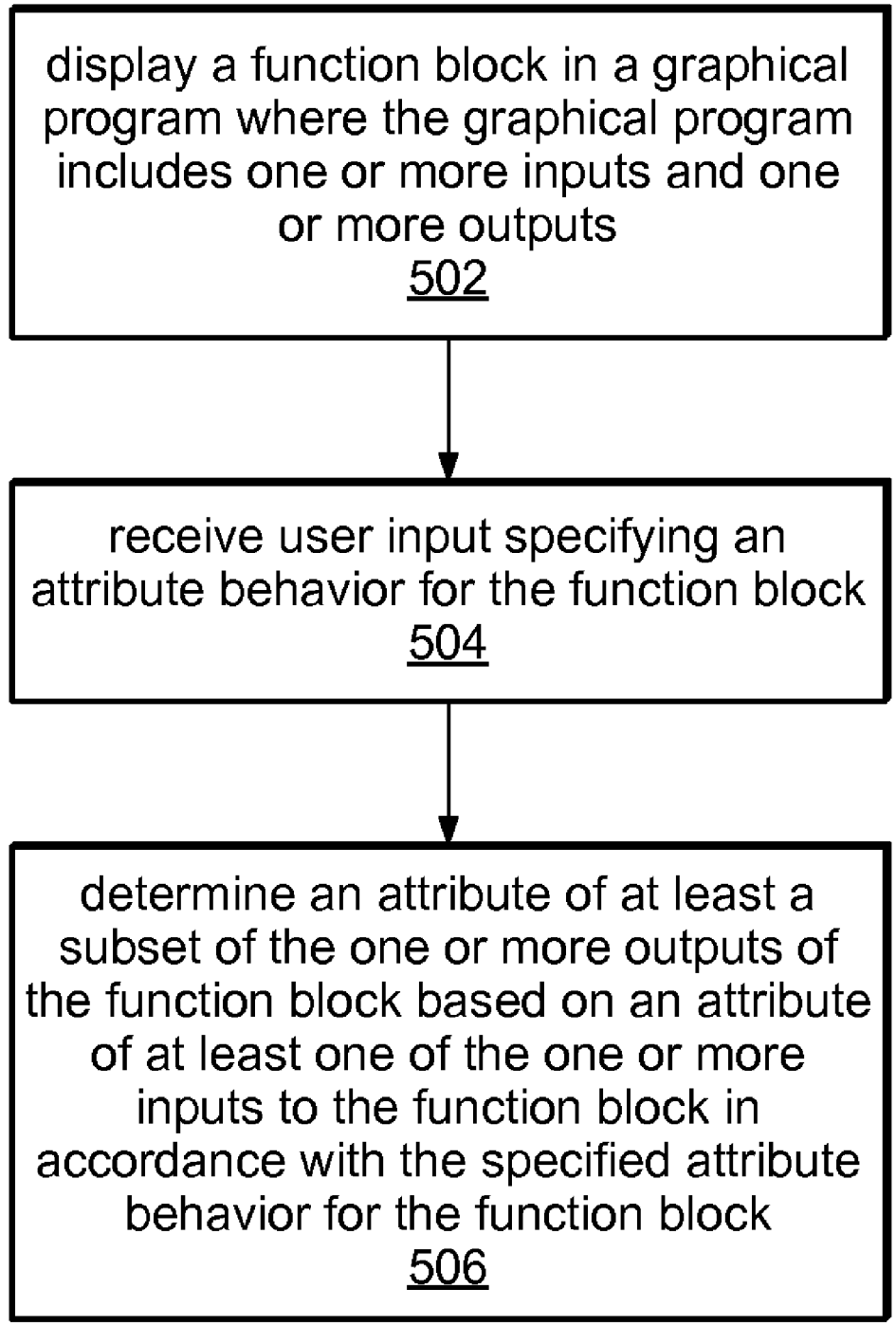
FIG. 5 is a flowchart diagram illustrating one embodiment of a method for propagating attributes of nodes in a graphical program.

FIG. 5—Method for Propagating Attributes of Nodes in a Graphical Program

In the exemplary embodiment shown in FIG. 5, FIG. 5 illustrates a method for propagating attributes of nodes in a graphical program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a function block may be displayed in a graphical program. The function block may be included in the graphical program via a variety of methods. For example, in some embodiments, the function block may be included in the graphical program manually. For example, the graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW™ graphical programming development environment to create the graphical program.

It should be noted that the function block may also be included in the graphical program via other methods, e.g., automatic methods. For example, in an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. Alternatively, the graphical program may be created in other manners, either by the user or programmatically (i.e., automatically), as desired. The graphical program may implement a measurement function that may be performed by the instrument.

In one embodiment, the user may define the graphical program using a wizard or scripting tool, e.g., one that allows the user to iteratively describe the graphical program. In some embodiments, the wizard may include a series of graphical windows which asks the user to specify attributes of the graphical program. Correspondingly, the graphical program may be automatically generated from input received to the GUI, e.g., via the wizard. Thus, via various embodiments, the function block may be included and displayed in the graphical program.

As used herein, the term "functional block" is intended to include various graphical blocks or nodes included in the graphical program. For example, the functional block may include one or more inputs, e.g., coupled to one or more outputs of a second block(s) (or node), and one or more outputs, e.g., coupled to one or more inputs of a third block(s) (or node), and may perform a function using the one or more inputs (or a subset thereof) to produce the one or more outputs (or a subset thereof). More specifically, the function block may be a simple multiply or addition function block (or node) that performs simple functions on the inputs to generate an output. Alternatively, the function block may be more complex, or may represent a larger series of functions or processes to be performed on the inputs to generate the one or more outputs. For example, the function block may process the input signals in various ways, e.g., normalization, phase shifting, or other signal processing functions, using a series of functions. In one embodiment, the function block may actually represent a series of complex or simple function blocks, e.g., to perform the functions described above, among others. More particularly, the user may be able to select the function block and view the one or more internal structures, function blocks, nodes, or others, which represent or implement the function performed by the function block. Thus, according to various embodiments, the function block may be any of various structures or nodes which receives one or more inputs and produces one or more outputs.

In some embodiments, the one or more inputs and one or more outputs may include various attributes. For example, the attributes may include the bit or byte width and/or the representation, e.g., describing the data type attribute, of the inputs and/or outputs of the function block. As a more specific example, the a function block may be a multiplier block, and it may receive two inputs, e.g., a first input with attributes two's complement representation and bit width 8 which comprises integers from −128 to 127, and a second input with attributes binary and bit width 4 which comprises integers from 0 to 15. Thus, the function block may include an output with a value having attributes of two's complement representation and bit width 12 comprising integers from −2048 to 2047, according to one embodiment. In some embodiments, the attributes may also include a scale value and/or an offset value, e.g., when the function block/graphical program implements "fixed point" functions or overall schemes. For example, the scale and offset may specify the mapping of integers stored in a memory medium to a set user-desired numbers. As a more specific example, with a scale of 0.25 and an offset of 5 the integers 0 to 15 may be mapped to the numbers 5, 5.25, 5.5, . . . , 8.75.

Alternatively, or additionally, the attribute(s) may include word length, integer word length, fraction word length, minimum value, maximum value, precision, delta, increment, and/or other attributes, such as those described above, among others. In some embodiments, the word length may refer to the minimum number of digits to store. Similarly, integer word length may refer to the minimum number of digits that may be used to store integer information, and fractional word length may refer to the minimum number of digits that may be used to store fractional information. Minimum and maximum values may refer to the smallest and largest values (respectively) to be represented. Precision, delta, and/or increment may each refer to the maximum distance between two consecutive numbers in the set of numbers represented (e.g., in the input/output of the node). Note that the above attributes are exemplary only and that other attributes are envisioned. Thus, according to various embodiments, the attributes may be any of numerous appropriate attributes of the inputs/outputs of the node(s).

In 504, user input may be received which specifies an attribute behavior for the function block. In some embodiments, the attribute behavior may define an attribute at least a subset of the one or more outputs based on an attribute of at least a subset of the one or more inputs. Additionally, the attribute behavior may also be based on one or more other graphical program objects (e.g. controls or indicators) or the graphical programming environment (e.g. target device limits, described in more detail below). Said another way, the attribute behavior may determine output attributes based on input attributes, attributes of other graphical program objects, or attributes of the graphical program environment, e.g., independent of the values associated with the inputs and outputs. In some embodiments, the attribute of the outputs may include the attribute of the inputs (or vice versa). Following the example above where the first input was of two's complement representation and bit width 8 and the second input was of binary representation and bit width 4, the user may define the attribute behavior to make the output bit width the sum of the bit width and the same representation as one of the inputs. Thus, following this attribute behavior, the output may be two's complement representation and bit width 8.

In some embodiments, as indicated above, the attributes may also be based on other objects in the graphical program. For example, given the output of an operator wired to an indicator the attribute behavior may be based (at least in part) on user configuration of indicator attributes. Alternatively, or additionally, the attributes may be based on other attributes of the graphical programming environment. For example, the target system (e.g., a target device that receives data transmitted thereto and/or executes a portion of the graphical program, among others) may provide limits to the bit width, or users may impose a global limit on bit width which may apply to all blocks/nodes in the graphical program, e.g., without regard to target limits. Thus, the attribute behavior may be based on factors other than the input attributes of the function block.

The user may specify the attribute behavior for any of various attributes. In one embodiment, the attributes may include the input and/or output attribute(s) described above, among others. For example, the user input may specify the scale value of the output given the scale values (or other attributes) of one or more of the inputs. More specifically, the attribute behavior may determine that the output should have the same scale value as the inputs, or, for example, the smallest scale value of the inputs. Thus, the attribute behavior may propagate scale values of inputs and/or outputs in a graphical program, e.g., in fixed point applications. However, it should be noted that this particular attribute and associated behavior is exemplary only and that other attributes and behaviors are envisioned. Thus, in some embodiments, the attribute behavior may be associated with any of various attributes described above, among others.

In one embodiment, the user may specify the attribute behavior by selecting the function block, e.g., for configuration. Upon selecting the function block, the user may specify the behavior via a graphical user interface, e.g., one usable to configure or specify the attribute behavior. In some embodiments, the graphical user interface may be a simple menu interface that allows the user to select or define a rule which specifies the attribute behavior for the function block. For example, as described above, the user may simply select a rule that defines the representation according to the representation(s) of the input(s) and defines the bit width as the greatest bit width of the inputs. Alternatively, if that rule is not available, the user may be able to enter the attribute behavior via various input methods, e.g., using a keyboard and/or mouse.

In some embodiments, the user may specify the attribute behavior by specifying a graphical program, e.g., a data flow graphical program. In this embodiment, the user may select the function block, e.g., by double clicking function block or right clicking the function block and selecting a "specify attribute behavior" (or similar option), and may then specify a graphical program which implements the desired attribute behavior, e.g., using a graphical program window. For example, in one embodiment, the user may arrange nodes (blocks or other icons) in a graphical program, e.g., displayed in the graphical program window, that represent attributes of the inputs and outputs. More specifically, in one embodiment, the user may simply specify that the bit width of the output may equal the greatest bit width of the inputs, e.g., using a Boolean or if node in the graphical program. Alternatively, the user may specify that the bit width of the output equal the sum of the bit widths of the inputs, e.g., by using an addition node and "bit width" input nodes. Similarly, the user may specify that the representation of the one or more outputs should be the same as the inputs, e.g., using the graphical programming environment in the graphical program window. Other attributes may be specified using this graphical programming method.

Alternatively, or additionally, the user may not necessarily manually specify the graphical program that defines the attribute behavior the function block. For example, the graphical program may be defined using other methods, such as those described above, among others. In one embodiment, the graphical program associated with the attribute behavior may be defined via automatic methods, e.g., via scripting tools or algorithmic processes, among others. Similar to descriptions above, the graphical program may be defined interactively with the user, e.g., using a wizard. Thus, the user may define the desired attribute behavior iteratively through a guided process, e.g., through a series of graphical windows which may be used to define the attribute behavior.

In some embodiments, the user may not specify the attribute propagation of the input(s)/output(s) of the function block for only the selected function block. For example, the user may be able to specify a global propagation behavior or default propagation behavior for every node in the graphical program. Alternatively, or additionally, the user may choose a group of nodes/function blocks and assign attribute propagation for the inputs/outputs of those function blocks. In one embodiment, the user may be able to choose how each type of function block behaves in the graphical program. For example, the user may assign a default behavior for all multiply nodes, add nodes, and/or subtract nodes, among other types of function nodes. Correspondingly, when the user creates a new node of that type, the function node may propagate attributes according to the assigned default behavior. Additionally, or alternatively, the function nodes of that type that already exist in the graphical program may be changed to the default behavior, e.g., according to the desire of the user.

Similar to above, the user may specify these attribute propagations via a variety of appropriate methods, e.g., menus, wizards, other GUIs, and/or other methods. For example, in one embodiment, the user may edit a single node and then have the option to apply this configuration to other types of nodes or future nodes, e.g., of the current type. Alternatively, or additionally, the user may specify the behavior as a project preference in the graphical program. Thus, according to various embodiments, the user may specify that the attribute propagation apply to a variety of other nodes in the graphical program.

Note that in the embodiments described above, the input specifying the attribute behavior may be received from a user; however, in some embodiments, the attribute behavior may be specified indirectly or automatically, e.g., via algorithmic processes, or via indirect user input, among other methods. In some embodiments, the attribute behavior may be inferred from other input, e.g., as specified for previous function blocks programmed in the graphical program environment. Alternatively, or additionally, the attribute behavior may be determined using a default value which may be overridden by the user or by other processes in the graphical program. Thus, in some embodiments, the attribute behavior may be determined/specified via a variety of methods.

The methods described above may provide benefits over the method provided by Bartlett (described and incorporated by reference above). In particular, the user may not have to manually create and specify separate propagation blocks for each function block in the program. Instead, the user may specify propagation for each function block, e.g., by directly selecting the function block, and/or via the various methods described above, among others. Thus, the current method provides a more streamlined and efficient process for specifying and implementing attribute propagation for a function block than the one provided by Bartlett.

In 506, an attribute of a subset of the outputs of the function block may be determined based on an attribute of at least one of the inputs to the function block and/or other object(s)/setting(s) regarding the graphical program. In some embodiments this propagation may be performed during execution of the graphical program. Additionally, or alternatively, the propagation may be performed during edit time which may allow the user to view the propagated attributes across the entire graphical program and adjust as desired. This edit time propagation may be performed automatically, e.g., in accordance with the specified attribute behavior. In other words, the user may not have to specify or indicate in the development environment that the attributes should be propagated. Said another way, the attributes for an input or output may be propagated in real time as the user connects nodes and/or function blocks in the graphical program. Thus, in some embodiments, the attribute propagation may be performed during execution and/or edit time and may allow the user to view the propagation seamlessly and automatically.

Thus, the attribute may be determined in accordance with the specified attribute behavior for the function block. Following the example where the rule was defined as the sum of the bit widths of the inputs and the representation of one or more of the inputs, the output may be of bit width 12 and of two's complement which may be shown and computed during editing. Note that this value is exemplary only, and that the output value may have the attributes as defined by the attribute behavior and the attributes of the input(s). Thus, attributes of at least one of the outputs may be determined according to at least one of the input attributes and the specified attribute behavior.

Thus, according to various embodiments, attributes may be propagated for inputs and/or outputs of a function block in a graphical program.

FIGS. 6-9—Exemplary Function Block with Attribute Propagation

FIGS. 6-9 are exemplary screen shots which illustrate a method for configuring propagation of attributes for a function block. It should be noted that the following descriptions and Figures are exemplary only and are not intended to limit the invention in any way. In other words, the following describes one exemplary embodiment of a method for configuring attribute propagation for a function block and other systems and methods are envisioned. Additionally, various ones of the systems and methods described above may also be used with respect to the methods/systems described below.

Figure 6:
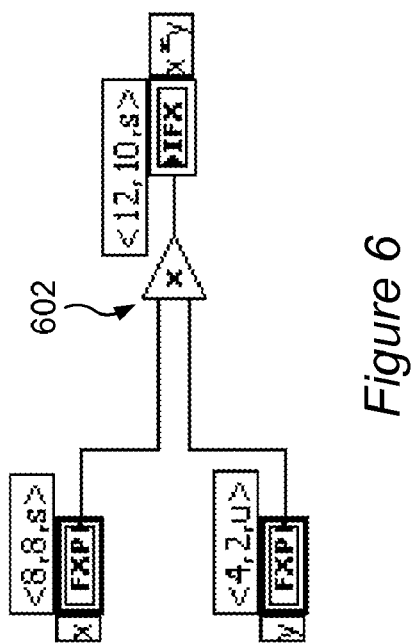

FIG. 6 is an exemplary first graphical program which multiplies variable 'x' and variable 'y' using a multiply node 602 to yield a product 'x*y'. As shown, the input 'x' is a signed number (representation attribute), 8 bits long (word length attribute), and has 8 integer bits (integer word length attribute). The input 'y' is an unsigned number, 4 bits long, and has 2 integer bits. The current output 'x*y' is a signed number which is 12 bits long and has 10 integer bits. This attribute behavior (which adds the word length and integer word length and assigns the representation) may be a default behavior for the graphical program (e.g., as chosen in the graphical programming environment) or may have been previously specified by the user, among other methods.

Figure 7:
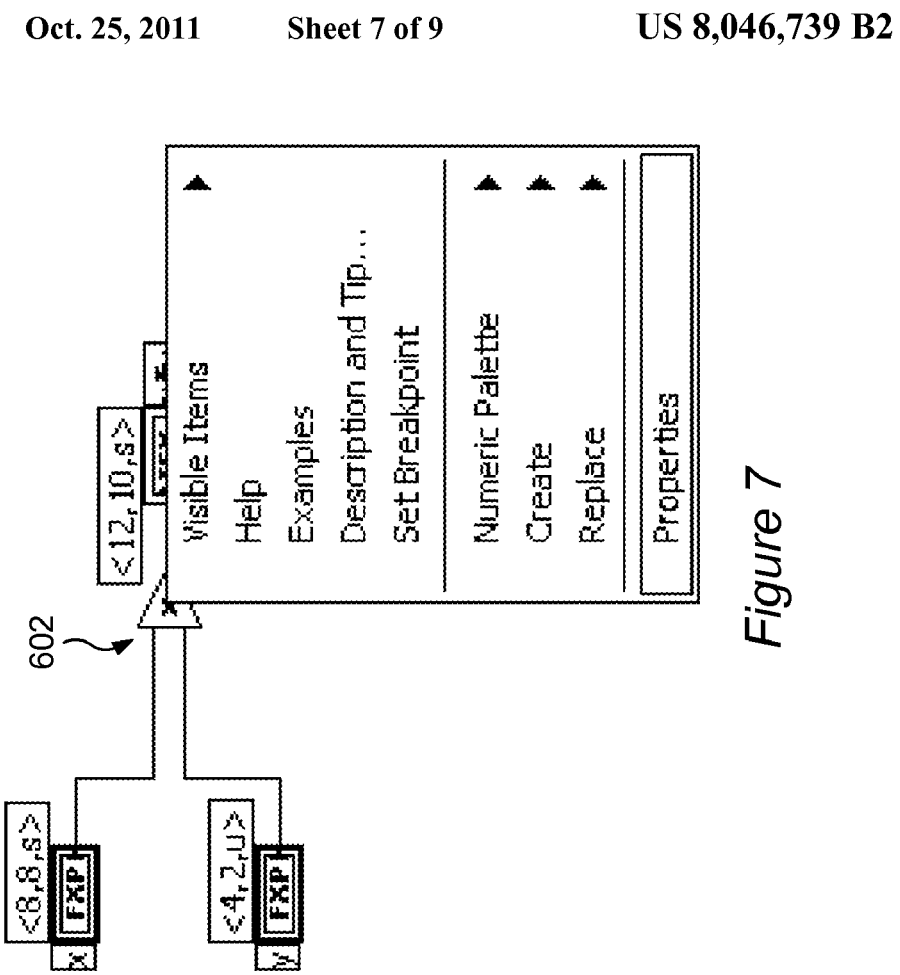
FIGS. 6-9 are exemplary screen shots illustrating one embodiment of a method for propagating attributes of nodes in a graphical program.

FIG. 7 is a screen shot where the user may select the multiply node and then select the properties of the multiply node 602. In some embodiments, this may be performed by right-clicking the multiply node and selecting the properties label in the resulting menu. However, it should be noted that this method is exemplary only, and that other methods for selecting and viewing the attribute behavior are envisioned. For example, the user may choose the output wire or the output itself to determine the attributes of the output. Additionally, menus other than the one shown in FIG. 7 are envisioned. For example, in one embodiment, the user may not select the properties label, and instead the user may be able to choose a more specific option, e.g., an attribute propagation option, among others. Thus, according to various embodiments, the user may select the multiply node and choose to view/modify the current propagation settings via a variety of appropriate methods/menus as desired.

Figure 8:
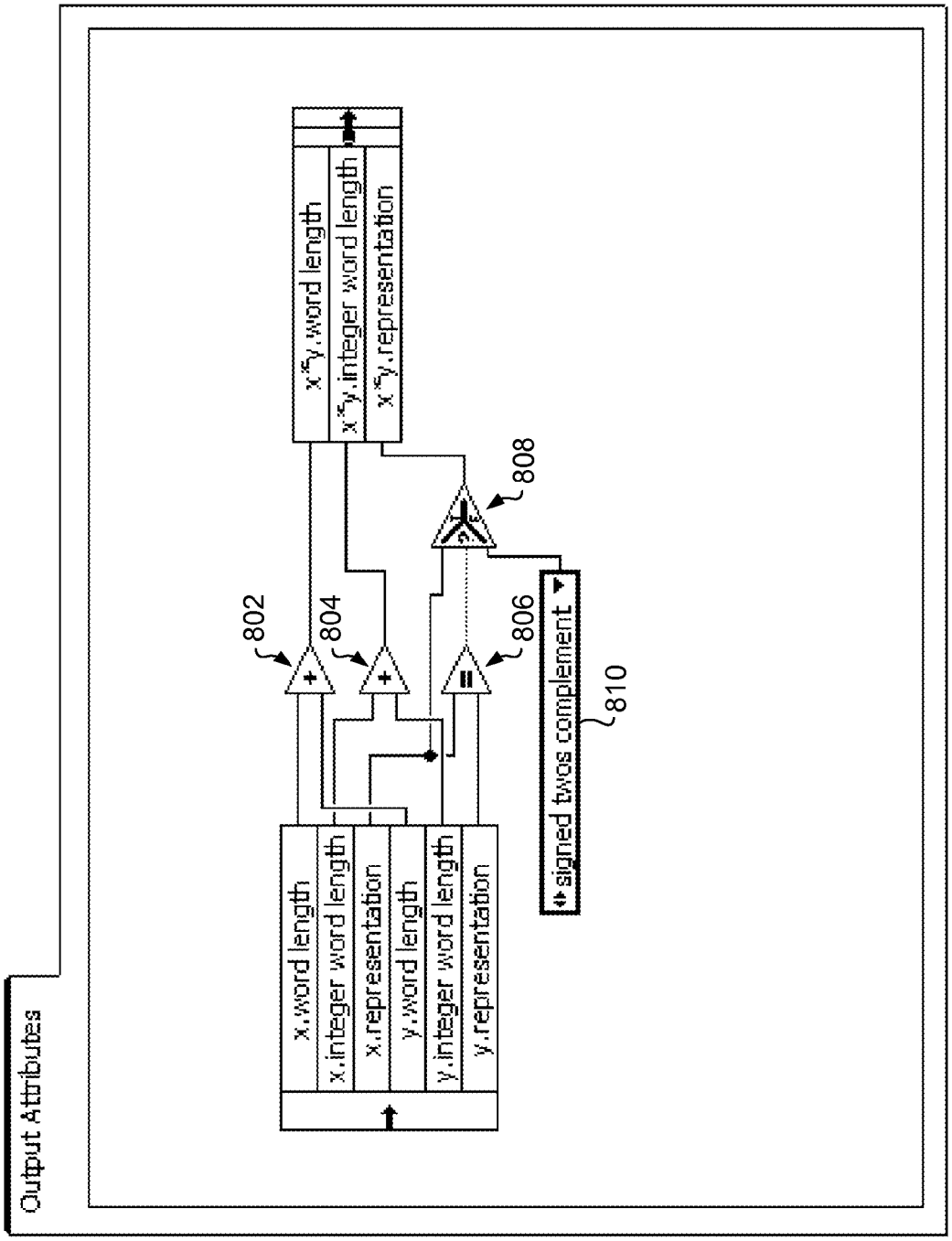

FIG. 8 is a screen shot which illustrates a second graphical program which specifies the propagation of attributes for the output of the multiply node 602 in the first graphical program shown in FIGS. 6 and 7. As shown, the word length of variable 'x' (x. word length) and the word length of variable 'y' (y.word length) may be added together in add node 802 to form the word length of 'x*y' (x*y.word length). Similarly, the integer word length of 'x' (x.integer word length) and the integer word length of 'y' (y.integer word length) may be added in add node 804 to form the 'x*y' integer word length (x*y.integer word length). As also shown, if the representation of 'x' (x.representation) and the representation of 'y' (y.representation) are the same (as checked by the '=' and Boolean nodes 806 and 808) the 'x*y' representation (x*y.representation) may be the same as the representation of 'x'. However, where the two representations are not the same, the x*y.representation may be assigned as "signed twos complement" 810 (as shown in FIG. 8). Thus, according to the exemplary embodiment of FIG. 8, the second graphical program may specify attributes of the output of the multiply node of the first graphical program shown in FIGS. 6 and 7.

Figure 9:
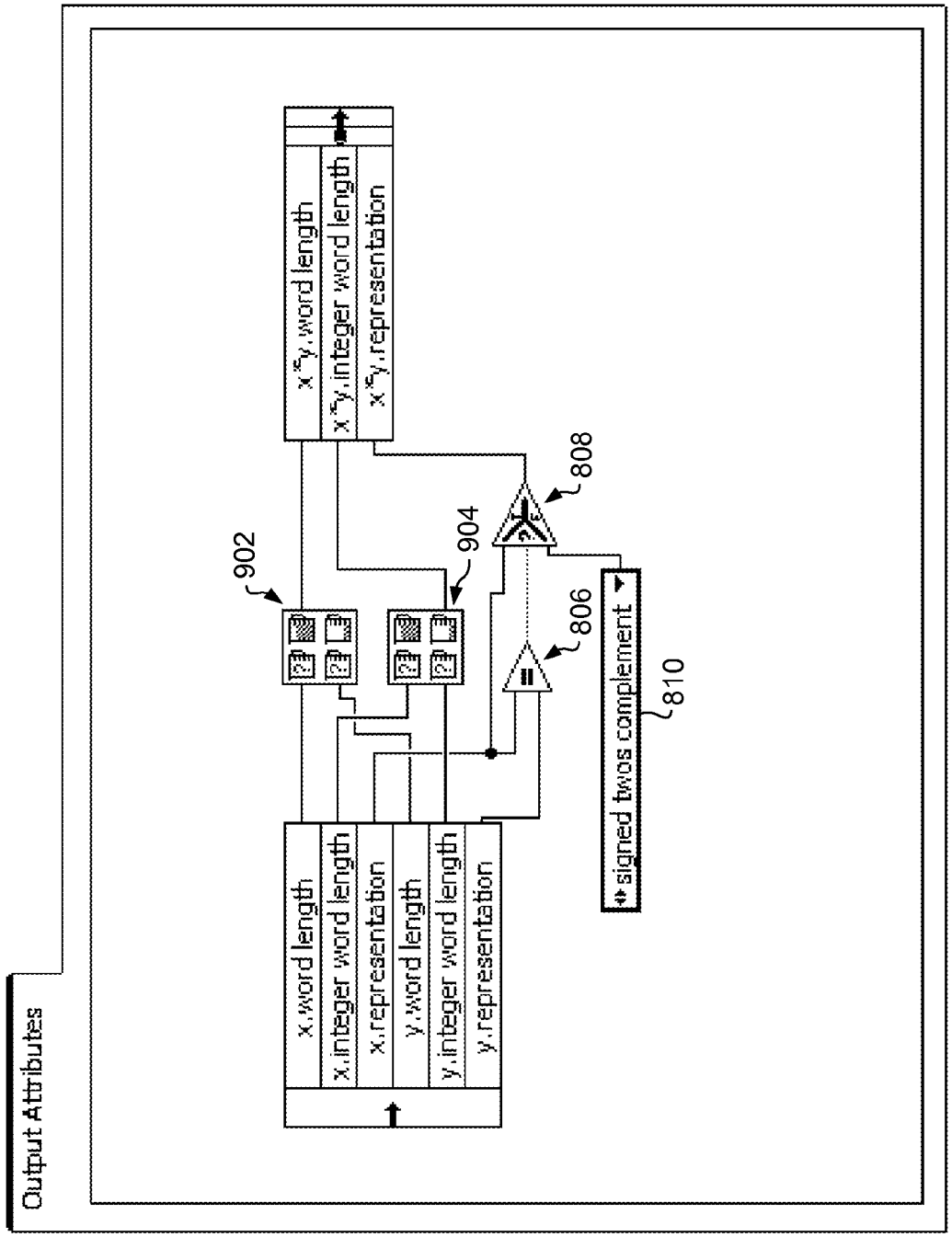

FIG. 9 is a screen shot where the user has modified the second graphical program. As shown, the attributes of the word length and integer word length of the product are now determined according to a different set of nodes (minimum/maximum nodes 902 and 904). As indicated above, this change may be performed in response to user input, e.g., where the user may drag the new nodes into the second graphical program and assign the inputs and outputs of the nodes as shown in FIG. 9. In the modified second graphical program, the output word length is now assigned as the maximum of the 'x' and 'y' word lengths (using the minimum/maximum node 902), and the output integer word length is assigned as the minimum of the 'x' and 'y' integer word lengths (using the minimum/maximum node 904). As also shown, the rest of the graphical program in FIG. 9 may operate as described in FIG. 8. Thus, in various embodiments, the user may modify the second graphical program to change the propagation of attributes of the inputs and/or outputs of the multiply function block illustrated in the first graphical program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory, computer readable memory medium comprising program instructions for creating a graphical program, wherein the program instructions are executable to:
   display a function block in a graphical program, wherein the function block is configured to perform a first function, wherein the function block comprises one or more inputs and one or more outputs, and wherein the graphical program comprises a first plurality of interconnected blocks which visually indicate the functionality of the graphical program;
   receive user input selecting the function block to configure the function block;
   receive user input assembling a second graphical program that visually specifies calculation of attributes of the one or more outputs based on attributes of the one or more inputs, wherein the second graphical program comprises a second plurality of interconnected blocks which visually indicate the calculation of the attributes of the one or more outputs, wherein said receiving user input assembling is performed in response to the user input selecting the function block.

2. The non-transitory, computer readable memory medium of claim 1,
   wherein, in receiving user input assembling the second graphical program, the program instructions are executable to display a graphical user interface element for specifying attribute behavior.

3. The non-transitory, computer readable memory medium of claim 1,
   wherein the graphical program is a data flow graphical program.

4. The non-transitory, computer readable memory medium of claim 1, wherein the program instructions are further executable to:
   connect the function block to receive the one or more inputs from a second block comprised in the graphical program; and
   connect the one or more outputs of the function block to a third block comprised in the graphical program.

5. The non-transitory, computer readable memory medium of claim 1, wherein the attributes of the one or more inputs and/or the attributes of at the one or more outputs comprises bit or byte width.

6. The non-transitory, computer readable memory medium of claim 1, wherein the attributes of the one or more inputs and/or the attributes of at the one or more outputs comprises one or more representations.

7. The non-transitory, computer readable memory medium of claim 1, wherein the attributes of the one or more inputs and/or the attributes of at the one or more outputs comprises one or more of:
   one or more data types;
   one or more offsets;
   bit or byte width;
   one or more maximum values;
   one or more minimum values;
   one or more word lengths;
   one or more fractional word lengths;
   one or more integer word lengths;
   one or more representations; or
   one or more scaling factors.

8. The non-transitory, computer readable memory medium of claim 1, wherein the graphical program comprises a block diagram model.

9. The non-transitory, computer readable computer readable memory medium of claim 1,
   wherein the second graphical program defines the attribute behavior is a data flow graphical program.

10. The non-transitory, computer readable computer readable memory medium of claim 1, wherein at least one of the attributes of the one or more outputs of the function block comprises at least one of the attributes of the one or more inputs to the function block.

11. The non-transitory, computer readable computer readable memory medium of claim 1, wherein the program instructions are further executable to:
    automatically propagate attributes of the one or more outputs of the function block by executing the second graphical program, wherein the automatic propagation does not require user input indicating that the attributes should be propagated.

12. A method for creating a graphical program, comprising:
    displaying a function block in a graphical program, wherein the function block is configured to perform a first function, wherein the function block comprises one or more inputs and one or more outputs, and wherein the graphical program comprises a plurality of interconnected blocks which visually indicate the functionality of the graphical program;
    receiving user input selecting the function block to configure the function block;
    receiving user input assembling a second graphical program that visually specifies calculation of attributes of the one or more outputs based on attributes of the one or more inputs, wherein the second graphical program comprises a second plurality of interconnected blocks which visually indicate the calculation of the attributes of the one or more outputs, wherein said receiving user input assembling is performed in response to the user input selecting the function block;
    executing the graphical program; and
    during said executing the graphical program, the function block automatically determining the attributes of the one or more outputs of the function block based on the attributes of the one or more inputs to the function block, wherein said determining comprises executing the second graphical program.

13. The method of claim 12,
    wherein said receiving user input assembling the second graphical programs comprises displaying a graphical user interface element for specifying attribute behavior.

14. The method of claim 12, further comprising:
    connecting the function block to receive the one or more inputs from a second block comprised in the graphical program; and
    connecting the one or more outputs of the function block to a third block comprised in the graphical program.

15. The method of claim 12,
    wherein said receiving user input specifying the attribute behavior comprises receiving user input selecting the function block for configuration of the attribute behavior.

16. The method of claim 12, wherein the attributes of the one or more inputs and/or the attributes of at the one or more outputs comprises one or more of:
    one or more data types;
    one or more offsets;
    bit or byte width;
    one or more maximum values;
    one or more minimum values;

one or more word lengths;
one or more fractional word lengths;
one or more integer word lengths;
one or more representations; or
one or more scaling factors.

17. A non-transitory, computer readable memory medium storing program instructions of a function block included in a graphical program, wherein the program instructions are executable to implement a function block comprising:
one or more inputs; and
one or more outputs;
wherein the function block is configured to perform a first function, and wherein the graphical program comprises a plurality of interconnected blocks which visually indicate the functionality of the graphical program;
wherein the function block is configured to receive user input specifying an attribute behavior for the function block, wherein the user input assembles a second graphical program that visually specifies calculation of attributes of the one or more outputs based on attributes of the one or more inputs, wherein the second graphical program comprises a second plurality of interconnected blocks which visually indicate the calculation of the attributes of the one or more outputs, wherein said receiving user input assembling is performed; and
wherein the function block is configured to automatically determine attributes of the one or more outputs of the function block based on attributes of the one or more inputs to the function block via execution of the second graphical program.

18. The non-transitory, computer readable memory medium of claim 17,
wherein the function block is configured to receive the user input via a graphical user interface element for configuring the attribute behavior.

19. The non-transitory, computer readable memory medium of claim 17,
wherein the one or more inputs are coupled to a second block comprised in the graphical program; and
wherein the one or more outputs are coupled to a third block comprised in the graphical program.

20. The non-transitory, computer readable memory medium of claim 17, wherein the attributes of the one or more inputs and/or the attributes of at the one or more outputs comprises one or more of:
one or more data types;
one or more offsets;
bit or byte width;
one or more maximum values;
one or more minimum values;
one or more word lengths;
one or more fractional word lengths;
one or more integer word lengths;
one or more representations; or
one or more scaling factors.

* * * * *